(12) United States Patent
Bukris et al.

(10) Patent No.: US 6,765,974 B1
(45) Date of Patent: Jul. 20, 2004

(54) RACH STARTING TIME VICINITY ESTIMATION

(75) Inventors: Moshe Bukris, Rishon Lezion (IL); Amnon Tal, Kfar-Sava (IL); Matty Levanda, Givat Shmuel (IL)

(73) Assignee: Radwin Ltd., Tel Aviv (IL)

( * ) Notice: Subject to any disclaimer, the term of this patent is extended or adjusted under 35 U.S.C. 154(b) by 466 days.

(21) Appl. No.: 09/619,338

(22) Filed: Jul. 19, 2000

(51) Int. Cl.[7] .................................................. H04L 7/00
(52) U.S. Cl. ....................... 375/354; 370/503; 375/367
(58) Field of Search ................................. 375/130, 140, 375/261, 298, 355, 354, 141, 145, 259, 260, 367; 370/503, 515

(56) References Cited

U.S. PATENT DOCUMENTS

| | | | |
|---|---|---|---|
| 4,979,168 A | | 12/1990 | Courtois |
| 5,383,220 A | * | 1/1995 | Murai ......................... 375/150 |
| 5,657,356 A | * | 8/1997 | Ozaki ......................... 375/346 |
| 5,737,361 A | * | 4/1998 | Park et al. .................. 375/149 |
| 5,822,359 A | | 10/1998 | Bruckert |
| 5,850,392 A | | 12/1998 | Wang |
| 5,883,887 A | | 3/1999 | Take |
| 5,933,465 A | * | 8/1999 | Ozaki ......................... 375/346 |
| 5,991,633 A | | 11/1999 | Corriveau |
| 6,014,562 A | | 1/2000 | Weiss |
| 6,028,852 A | | 2/2000 | Miya |
| 6,127,884 A | * | 10/2000 | Rishi ........................... 329/304 |
| 6,191,649 B1 | * | 2/2001 | Sugita et al. ............... 329/304 |

* cited by examiner

*Primary Examiner*—Jean B. Corrielus
(74) *Attorney, Agent, or Firm*—Katten Muchin Zavis Rosenman

(57) ABSTRACT

Terminal transmission method and the received signal model are used to develop two methods that estimate the starting time vicinity associated with a random access channel (RACH). First of said methods, called $I_n*Q_n$ RACH starting time vicinity estimation (STVE), multiplies the $I_n$ and $Q_n$ branches of a sample and exacts the starting time of a preamble signal from the peak output of the phase metrics expression (for both even and odd periodicity). The second method, called $(I_n+jQ_n)^2$ RACH STVE, performs a square operation on the received complex signal and calculates the peak output of the corresponding phase metric to extract the exact starting time of a preamble signal. Compliance with the standard of the $3^{rd}$ generation for cellular systems is also described whereby the timing is synchronized, the uncertainty of the preamble phase (at the base station) is minimized, and the complexity of the RACH receiver is significantly reduced

15 Claims, 8 Drawing Sheets

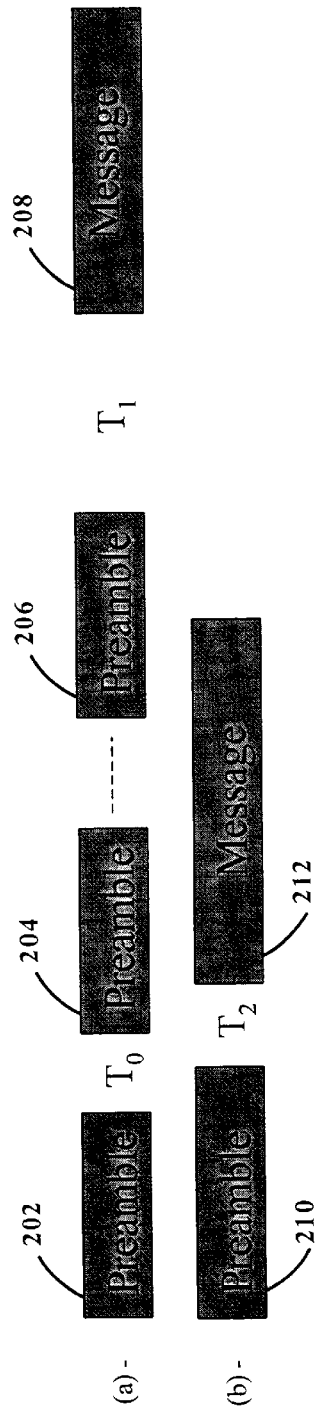
FIGURE 2
FIGURE 3
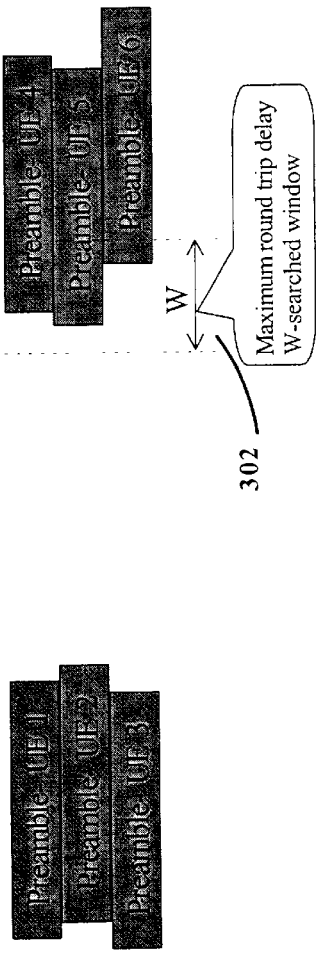

Notes:
(a) For arbitrary φ & φ, the phases at any point i.e. point number (i)- 2φ +2iφ, 2φ + 2(i+L)φ,... won't be converged.
(b) For proper φ & φ, the phases at any point i.e. point (i)- 2φ +2iφ, 2φ + 2(i+L)φ,..., will converge, however due to phase noise the point won't be converged ideally.
(c) For N complex observations with converged phase,
L - number of phases.
x = N/L -1, hence phase length observation is X=N/L.

RACH STARTING TIME VICINITY ESTIMATION

BACKGROUND OF THE INVENTION

1. Field of Invention

The present invention relates generally to the field of mobile and fixed communication systems. More specifically, the present invention is related to optimizing random access channel time vicinity estimation, in direct sequence spread spectrum systems, however the invention could be employed to other modulation technique as well.

2. Discussion of Prior Art

One of the common modes of communication today is through user's equipment (UE). UEs are operated in two modes, idle mode (or listening mode) and dedicated mode (or sending and receiving mode). UEs in dedicated mode monitor the surrounding base stations for handover in mobile case and other information. UE communications commonly utilize two kinds of channels, traffic channels (TCH) and control channels. Traffic channels (TCHs) are used to carry speech and data traffic, whereas control channels are used (by idle mode mobiles) to exchange signaling information or change to dedicated modes. Some examples of common control channels include:

Broadcast Control Channel (BCCH): serves for base station identification, broadcasts, and frequency allocations.

Frequency Correction Channel (FCCH) and Synchronization Channel (SCH): used for synchronization, and physical layer definition (time slots, burst time . . . ).

Random Access Channel (RACH): used by mobile to request access to the network.

Paging Channel (PCH): used for locating the mobile user.

Access Grant Channel: (AGCH) used to obtain a dedicated channel. (Following the request of RACH.)

Of growing interest is the Random Access CHannel or RACH, which is defined for transmission, as depicted in FIG. 1, from a plurality of UEs 102, 104, 106, 108, 110, 112, 114 to the base-station (BS) 100. FIG. 2 describes the general RACH structure. RACH is comprised of, a preamble part 202, 204, 206, 210 and a message part 208, 212. FIG. 2a describes one of the RACH structures wherein RACH message 208 is transmitted adjacent to the preamble 202, 204, 206 that was granted by the BS 100. Another RACH structure is detailed in FIG. 2b, wherein the RACH message part 212 is always transmitted after the preamble 210 (and hence no grant from BS 100 is needed). As can be seen from FIG. 3, the BS frame timing being seen by each of the terminals is different ($T_0$, $T_1$, and $T_2$) based on disparate propagation delays between each of the terminals and the BS 100. The difference in propagation delay is caused by the terminals' deployment (as is the case for fixed and Mobile deployment/distribution) and multi-path physical phenomenon. Therefore, the received preambles of some terminals at the BS 100 aren't synchronized to any specific timing, nor is there any synchronization among them. Thus, the BS 100 must 'search', as shown in FIG. 3, for the start of the preambles at an expected time window W 302. Receiving of terminal RACH is a very intensive task and one of the important things is the time vicinity that the receiver expects to get such an access; since in that time the receiver can use the resources in a better way. There are a variety of ways that are described in the prior art for determining the starting point of the preambles.

One of the ways to determine the starting point of the preambles is to estimate the receiving power to get a better starting point for the receiver. However, such an approach doesn't work for direct sequence (DS) spread spectrum or DSSS, since the terminal's channel share the same bandwidth (BW) at the same time. DSSS is probably the most widely recognized form of spread spectrum (and is commonly used in cellular communications) wherein first, the pseudo-noise (PN) code is modulated onto the information signal using one of several modulation techniques (for example BPSK or QPSK). Next, a doubly balanced mixer is used to multiply the RF carrier and PN modulated information signal. Thus, the RF signal is replaced with a very wide bandwidth signal and has the spectral equivalent of a noise signal. The use of DSSS is advantageous in communication systems as it is utilized effectively to conserve the bandwidth, to increase the data rate, and to increase immunity to noise interference.

In a DSSS scenario, as described above, there is a need for a system that estimates the RACH start time. The following references describe prior art in the field of random access channels, but none provide for the present invention's method of estimating the RACH starting time.

U.S. Pat. No. 4,979,168 assigned to U.S. Philips Corporation, provides for a Dynamic Sensing Point CSMA Packet Switching Controller. Disclosed is an estimation method for optimization of the sensing time interval. The reference teaches narrowing of a sensing interval by estimation using probabilistic techniques.

U.S. Pat. No. 5,822,359, assigned to Motorola, Inc., provides for a Coherent Random Access Channel in a Spread-spectrum Communication System and Method. A known synchronization is correlated with a received communication signal to generate a correlation peak when a synchronization message is present. A channel response is determined from the correlation peak and is revised based on estimates derived from the stream of reference samples.

U.S. Pat. No. 5,850,392, assigned to Ericsson Inc., provides for Spread Spectrum Random Access Systems and Methods for Time Division Multiple Access Radiotelephone Communication Systems. In communicating the spread spectrum random access channel signal, a random access channel signal, representing the random access channel message, is direct sequence modulated according to the spreading sequence to produce a direct sequence modulated random access channel signal. A synchronization sequence may be associated with a plurality of spreading sequences. The synchronization sequence may be first detected from the communicated spread spectrum random access channel signal, and in response to detection of the synchronization sequence, one of the plurality of spreading sequences associated with the detected synchronization sequence may be detected.

U.S. Pat. No. 5,883,887, assigned to Mitsubishi Denki Kabushiki Kaisha, provides for a Radio Data Transmission System. Of interest is the method disclosed to sense a RACH access including the probability of RACH shifting. However, the reference fails to disclose the preamble detection method of the present invention.

In all the above-described systems there is no mention of estimating RACH start times as mentioned earlier. Whatever the precise merits, features and advantages of the above cited references, none of them achieve or fulfills the purposes of the present invention. The current invention relates to the RACH Starting Time Vicinity Estimation (STVE) and is further compliant with the $3^{rd}$ generation for cellular systems. The present invention also enables to synchronize on the timing and minimize the uncertainty of the preamble phase at the BS, by which the complexity of the RACH receiver is significantly reduced. These and other objects are achieved by the detailed description that follows.

SUMMARY OF THE INVENTION

Estimating a starting time vicinity associated with a random access channel (RACH) wherein a terminal transmission method and a received signal model are utilized.

A first method, called $I_n * Q_n$ RACH starting time vicinity estimation (STVE), utilizes a signal that is obtained by multiplying the $I_n$ and $Q_n$ branches of a sample. Exact starting time of a preamble signal is calculated from the peak output of the phase metrics expression (for both even and odd periodicity). A second method, called $(I_n + jQ_n)^2$ RACH STVE, performs a square operation on the received complex signal and calculates the peak output of the corresponding phase metric to extract the exact starting time of a preamble signal. The present invention, in one embodiment, is in compliance with the standard of the $3^{rd}$ generation for cellular systems whereby the timing is synchronized, the uncertainty of the preamble phase (at the base station) is minimized, and the complexity of the RACH receiver is significantly reduced.

BRIEF DESCRIPTION OF THE DRAWINGS

FIG. 2 illustrates the RACH structure.

FIG. 3 illustrates Rx-unsynchronized preambles.

DESCRIPTION OF THE PREFERRED EMBODIMENTS

Figure 1:
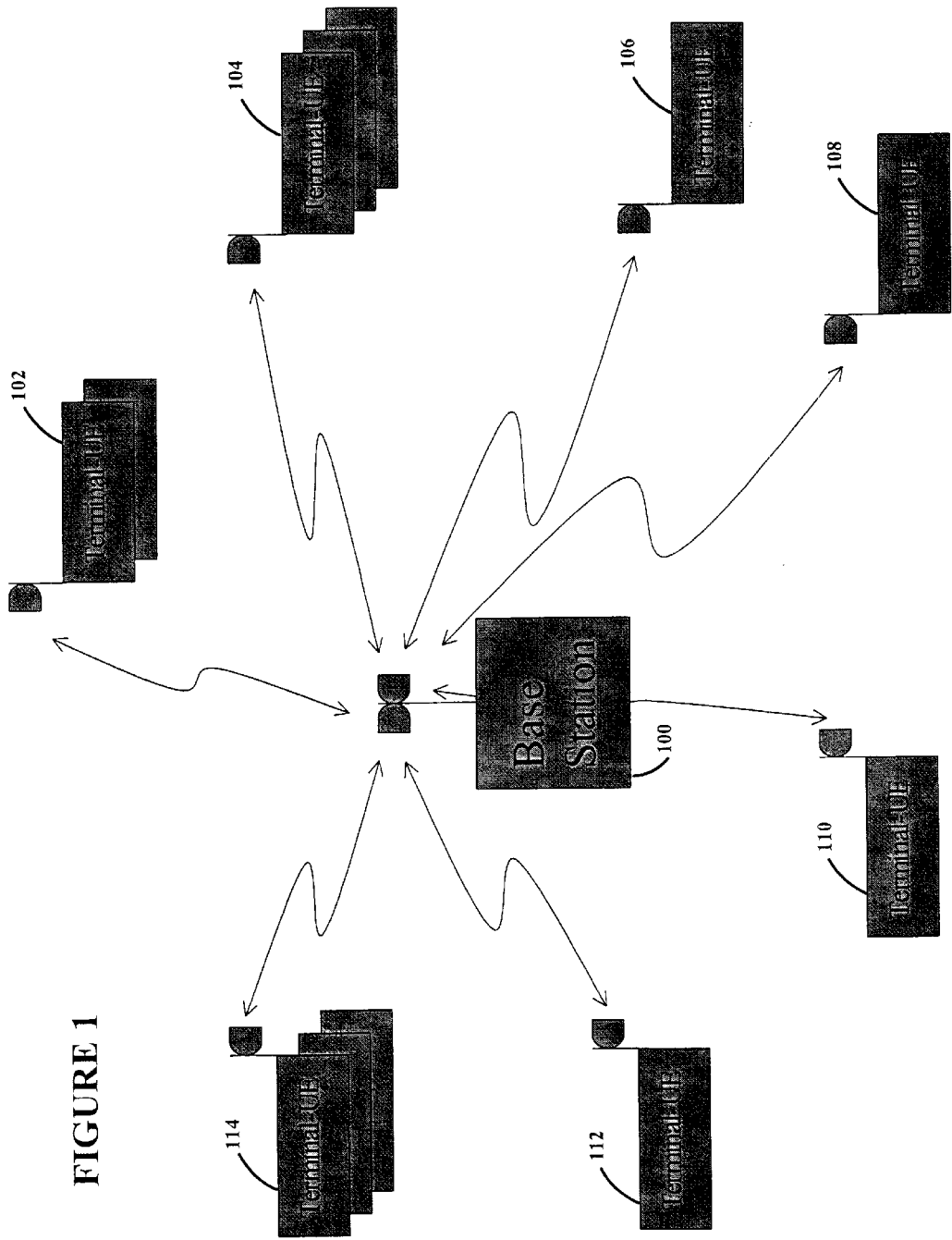
FIG. 1 Illustrates UEs deployment and distribution relative to base station.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

There are significant advantages (such as synchronization of timing, minimizing the uncertainty of the preamble phase at the BS, and reducing the complexity of the RACH receiver) in being able to identify the starting time of preambles. The present invention also has great applicability in communication systems due to its compliance to the standard of $3^{rd}$ generation cellular systems. Digital cellular future or $3^{rd}$ generation is an attempt to define a new digital system called universal mobile telecommunications system or UMTS.

Described in this section are two methods for estimating the starting time vicinity associated with a random access channel (RACH) wherein both the terminal transmission method and the received signal model are utilized.

A) Terminal Transmission Model

The $T_x$ preamble signal on which the RACH STVE is employed, is expressed by the following relation, $$T_x(n) = PN(n)[a(n) + jb(n)] = PN(n)R(n)e^{j\theta_n} = I_n + jQ_n \quad (1)$$

$$a(n) = a(n + L), \; b(n) = b(n + L)$$

$$R(n) = \sqrt{a^2(n) + b^2(n)}, \; \theta_n = \tan^{-1}\frac{b(n)}{a(n)}$$

Where

PN(n)—preamble information, pseudo random noise sequence ±1, hence $PN^2(n)=1$.

a(n), b(n)—periodical function with L period, hence R(n) and $\theta_n$ are also periodical with maximum period of L.

For a special case (1) is written as, $$T_x(n) = PN(n)e^{j(\phi + \Phi n)} = PN(n)[\cos(\phi + \Phi n) + j\sin(\phi + \Phi n)] \quad (1_s)$$

Where, $\phi$—Initial phase.

$\Phi = 2\pi/L$—Normalized phase oscillator.

Generally, in order to perform an optimal RACH STVE, the classical solution is to perform a cross correlation between the received signal expressed in $(1_s)$ to the known preamble. However this task requires intensive real time resources. The proposal goal is to simplify the RACH STVE by taking advantage of the transmitted period of the signal a(n)+jb(n) embedded in (1).

B) Received Signal Model

The general received signal, is expressed by the following relation, $$R_x(n) = T_x(n)C_n e^{j(\psi_n)} + N_n \quad (2)$$

Where, $C_n e^{j(\psi_n)}$—Channel influence.

$N_n$—Complex noise variable.

The channel influence is due to fading and the noise is due to thermal and multiple access user power. For the sake of the discussion we ignore the channel influence and the noise, hence $R_x(n)=T_x(n)$. Both cause degradation in the performance of any RACH STVE estimator.

Figure 6:
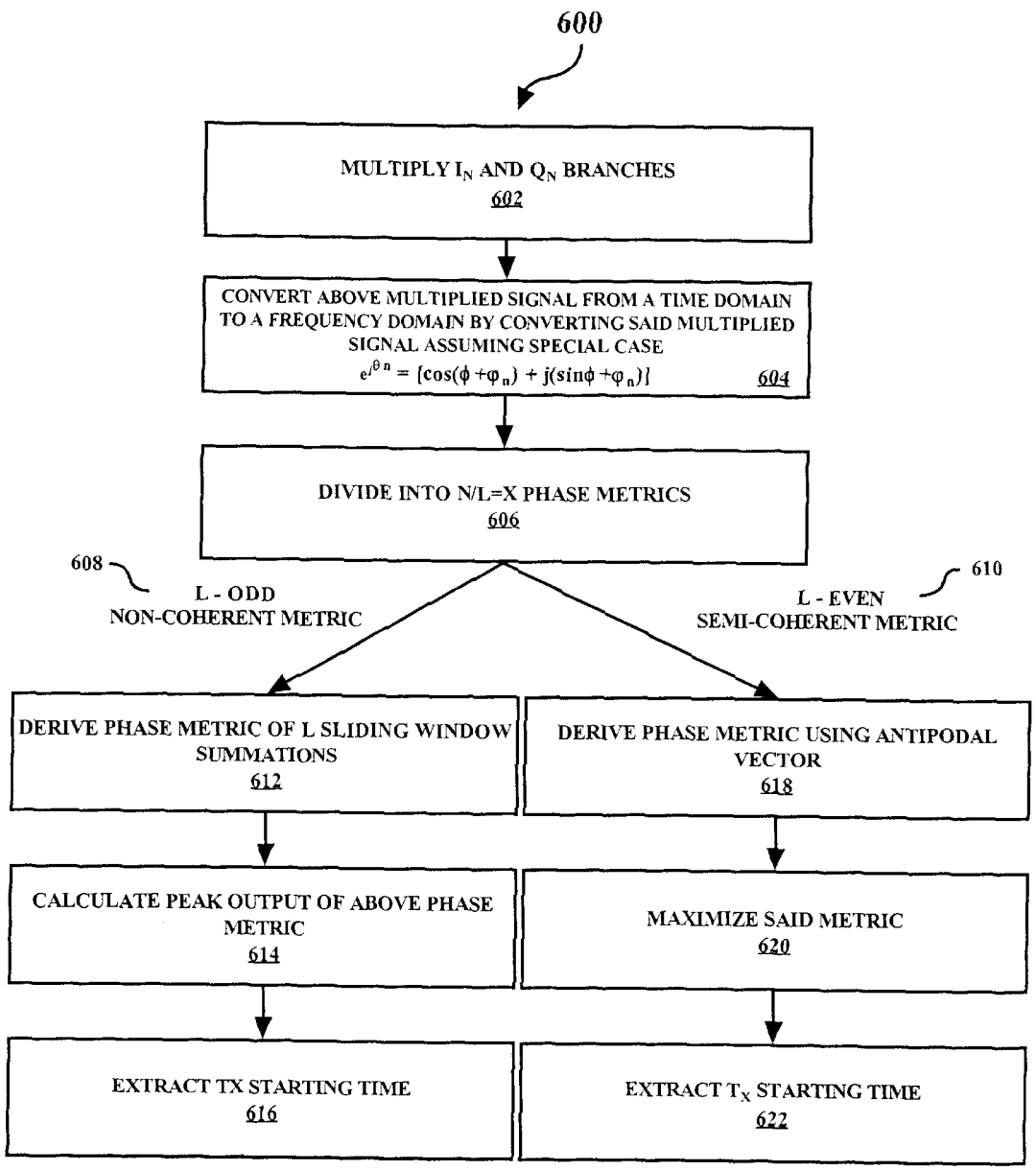
FIG. 6 illustrates the $I_n * Q_n$ RACH method.

Both of the present invention's methods for extracting the RACH starting times take into account the terminal transmission and received signal models described above. First of said methods, outlined in FIG. 6 and called $I_n * Q_n$ RACH starting time vicinity estimation (STVE) method 600, utilizes a signal that is obtained by multiplying branches of a sample. Multiplying the $I_n$ and $Q_n$ branches of sample n 602, we get the following expression, $$C_{IQ}(n) = PN^2(n)a(n)b(n) = C_{IQ}(n+L) \quad (3)$$

For the special case as expressed by $(1_s)$, (3) is rewritten 604 as follows, $$C_{S-IQ}(n) = PN^2(n)\cos(\phi + \varphi n)\sin(\phi + \varphi n) = \frac{1}{2}\sin(2\phi + 2\varphi n), \; \varphi = \frac{2\pi}{L} \quad (3_S)$$

The period of $(3_s)$ is given by:

$$\text{period} = \begin{cases} L & \text{for } L \text{ odd} \\ \dfrac{L}{2} & \text{for } L \text{ even} \end{cases}$$

The signal $C_{IQ}(N)$ is independent of the random modulation $PN(n)$ and has periodicity of maximum L. Hence, N observations can be divided into $N/L=X$ phase metrics 606. Phase metric n of a sliding window r (or 1 in special case) is defined by the following expressions, $$m_{IQ}(n, r) = \sum_{k=n-X+1}^{n} C_{IQ}(r + kL) \tag{4}$$

$$m_{S-IQ}(n, l, \phi, \varphi) = \frac{1}{2}\sum_{k=n-X+1}^{n} \sin(2\phi + 2\varphi(l + Lk)) \tag{4_s}$$

Figure 4:
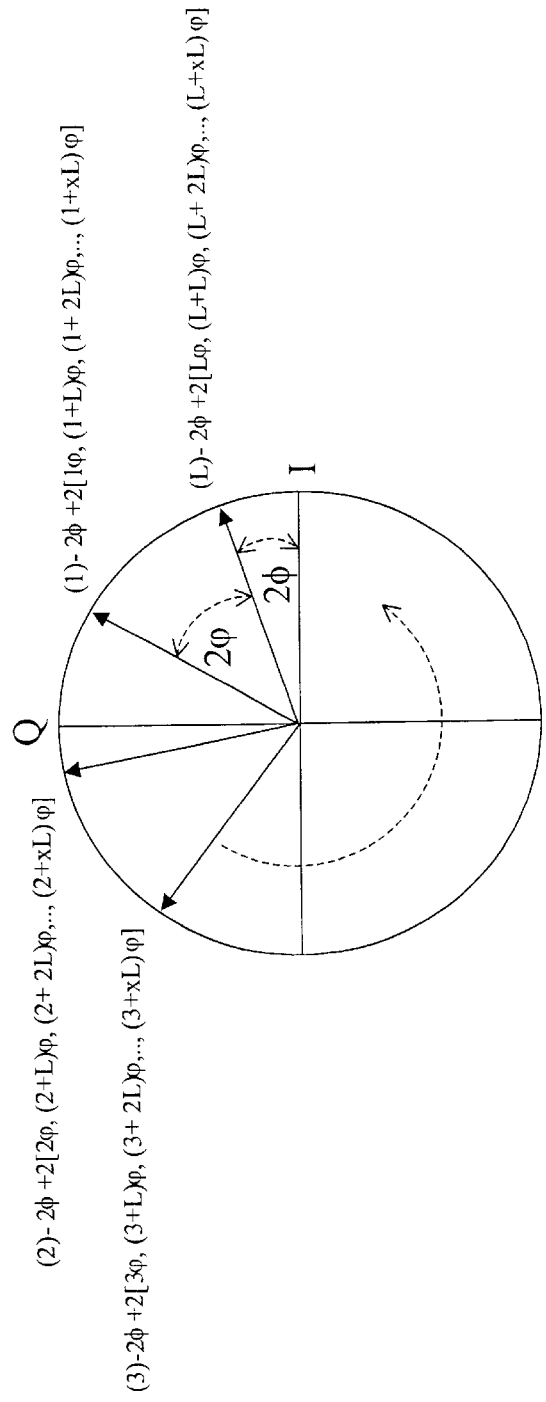
FIG. 4 illustrates phase rotation.

The phase rotation expressed in $(4_s)$ is described in FIG. 4. For arbitrary initial phase ($\Phi$) and normalized phase ($\phi$), the phases at any point won't converge and for a proper $\Phi$ and $\phi$, the phases at any point will converge, however, due to phase noise the point won't converge ideally.

Referring back to FIG. 6, one of two situations arise while calculating the RACH start time, one when the period L is odd 608 (non-coherent metric) and one when the period is even 610 (semi-coherent metric). When the period is odd 608, the I*Q RACH STVE receiver non-coherent metric, consists of L sliding window summations of phase metrics 612 given by (4) and is expressed as, $$M_{11/Q}(n) = \sum_{r=0}^{L-1} |m_{IQ}(n, r)| \tag{5}$$

For the special case (5) is expressed by the following, $$M_{11,S-IQ}(n, \phi, \varphi) = \frac{1}{2}\sum_{l=1}^{L} |m_{P-IQ}(n, l, \phi, \varphi)| \tag{5_s}$$

Calculating the peak output of $(5s)$ 614 gives the estimated timing of the $T_x$ starting time 616.

In the instance that L is even 610 (semi coherent metric), for each vector there will be the antipodal vector, hence the following exist, $$m_{IQ}(n,r)=-m_{IQ}(n,r+L/2)$$

and for the special case the following exist, $$m_{S-IQ}(n,l,\phi,\Phi)=-m_{S-IQ}(n,l+L/2,\phi,\Phi)$$

Therefore the I*Q RACH STVE receiver expressed by (5) is to be written in a semi-coherent way 618 as:

$$M_{12/Q}(n) = \sum_{r=0}^{L/2-1} |m_{IQ}(n, r) - m_{IQ}(n, r + L/2)| \tag{6}$$

And for the special case (6), is expressed by the following, $$M_{12S-IQ}(n, \phi, \varphi) = \frac{1}{2}\sum_{l=1}^{L/2} |m_{S-IQ}(n, l, \phi, \varphi) - m_{S-IQ}(n, l + L/2, \phi, \varphi)| \tag{6_s}$$

Maximizing $(6_s)$ 620 gives us the estimate for the starting time 622.

Example for the special case, $$M_{12S-IQ}(n, \theta, \varphi) = \frac{1}{2}\sum_{l=1}^{L/2}\left|\sum_{k=n-X+1}^{n} \sin(2\phi + 2\varphi[l + Lk]) - \sum_{k=n-X+1}^{n} \sin(2\phi + 2\varphi[(l + L/2)] + Lk])\right|$$

for the following parameters, $\phi=\pi/4$.

$\Phi=\pi/2$.

we have, L=2 and the following exist, $$M_{12S-IQ}(n, \pi/4, \pi/2) = \frac{1}{2}\left|\sum_{k=n-X+1}^{n} \sin(\pi/2 + \pi[l + 2k]) - \sum_{k=n-X+1}^{n} \sin(\pi/2 + \pi[(l + 1) + 2k])\right|$$

The maximum metric for the full semi coherent summation is, $$M_{12S-IQ}(n,\pi/4,\pi/2)_{Max}=N/2$$

Figure 8:
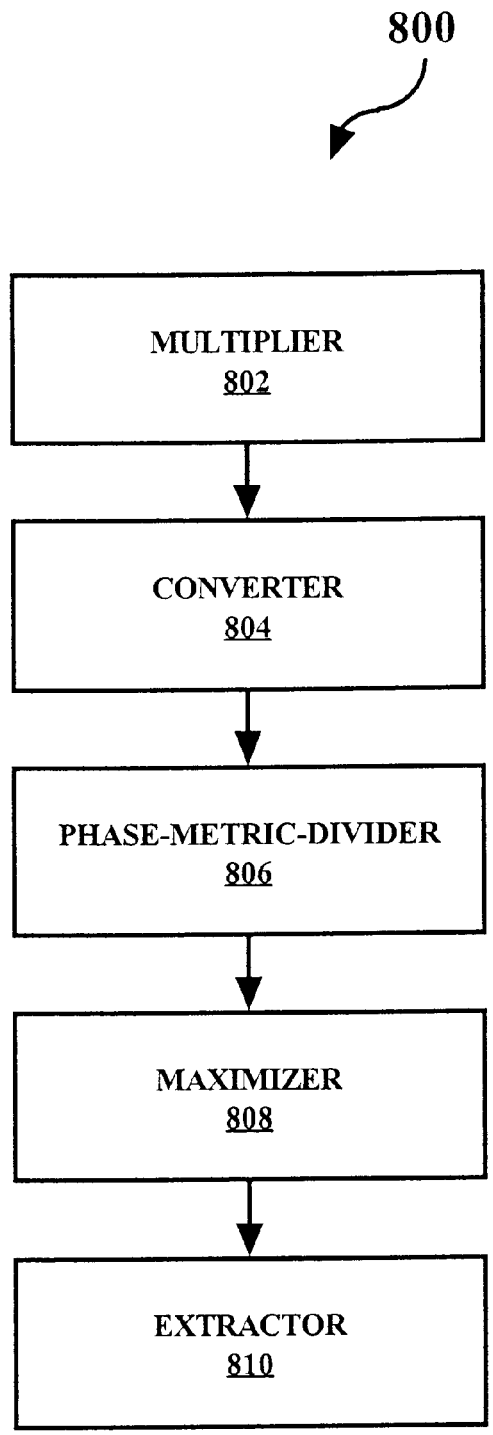
FIG. 8 illustrates the system representative of the method describes in FIG. 6.

FIG. 8 describes a system (based on the above method) 800 for estimating the random access channel starting time in a communication system, wherein said system includes a multiplier 802 (which multiplies a $I_N$ and a $Q_N$ branch of a signal), and a converter 804 which converts the multiplied signal from a time domain to a phase domain by converting the multiplied signal assuming a special case of $$e^{j\Theta n}=[\cos(\phi+\Phi_n)+j\sin(\phi+\Phi_n)]$$

Also included is a phase-metric-divider 806 which divides said rewritten signal into a phase metric function and a maximizer 808 which maximizes said phase metric based function on an even or odd period. Finally, an extractor 810 extracts the RACH starting time from the maximized function.

Figure 7:
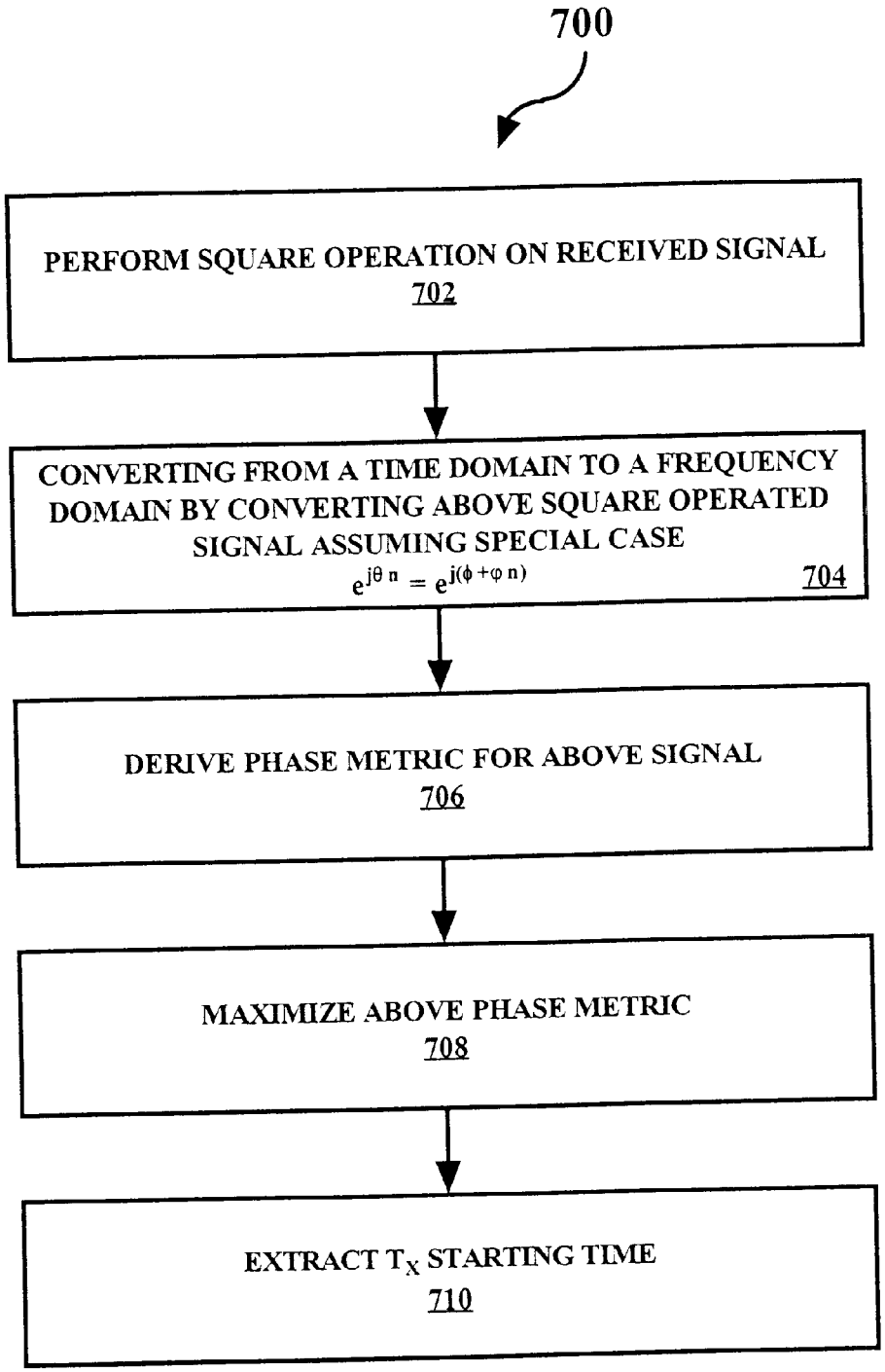
FIG. 7 illustrates the $(I_n + jQ_n)^2$ RACH STVE method.

FIG. 7, illustrates method 2 also called $(I_n+jQ_n)^2$ RACH STVE method 700. First, a square operation 702 on the received complex signal is performed yielding the following expression, $$C_{(I+jQ)^2}(n)=PN^2(n)R^2(n)e^{2j\Theta n}=C_{(I+jQ)^2}(n+L) \tag{7}$$

and rewriting (7) for the special case 704, $$C_{S-(I+jQ)^2}(n)=PN^2(n)e^{j2(\phi+\Phi n)} \tag{7_s}$$

As for method 1, the signal $C_{(I+jQ)^2}(n)$ is independent of the random modulation $PN(n)$ and has periodicity of maximum L. Each phase produces the following phase metric 706, $$m_{(I+jQ)^2}(n, r) = \sum_{k=n-X+1}^{n} C_{(I+jQ)^2}(r + kL) \quad (8)$$

and for the special case, $$m_{S-(I+JQ)^2}(n, l, \phi, \varphi) = \sum_{k=n-X+1}^{n} e^{j2(2\phi + 2\varphi(l+Lk))} \quad (8_S)$$

Note that this time we have a complex number, hence a full coherent RACH STVE could be employed, thus $$M_{(I+JQ)^2}(n) = \left| \sum_{r=0}^{L-1} e^{-2j\beta_n} m_{(I+JQ)^2}(n, r) \right| \quad (9)$$

$$M_{S-(I+JQ)^2}(n, \phi, \varphi) = \left| \sum_{l=1}^{L} e^{-j2l\varphi} \sum_{k=n-X+1}^{n} PN^2(n) e^{j2(\phi+\varphi[l+Lk])} \right| = \quad (9_S)$$

$$|e^{j2\varphi}| \left| \sum_{l=1}^{L} e^{-j2l\varphi} \sum_{k=n-X+1}^{n} PN^2(n) e^{j2\varphi[l+Lk]} \right|$$

Maximizing $(9_s)$ 708 gives us the estimate for the starting time 710.

For example:

φ–π/4.

Φ–π/2.

we have, L=2 and the following exist, $$M_{S-(I+jQ)^2}(n, \pi/4, \pi/2) =$$

$$\left| e^{-j\pi} \sum_{k=n-X+1}^{n} e^{j2(\pi/4+\pi/2[l+2k])} + e^{-j2\pi} \sum_{k=n-X+1}^{n} e^{j\pi[2+2n]} \right|$$

The maximum metric for the full coherent summation is, $$M_{12S-IQ}(n,\pi/4,\pi/2)_{Max}=N$$

Figure 9:
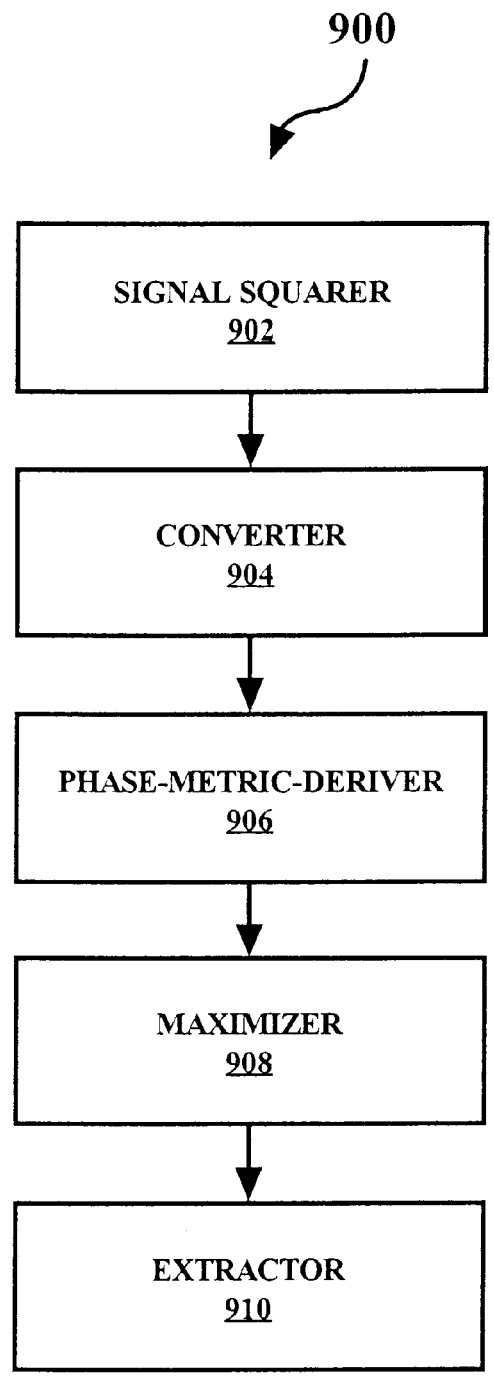
FIG. 9 illustrates the system representative of the method described in FIG. 7.

FIG. 9 illustrates a system (based on the above method) 900 for estimating the random access channel starting time in a communication system, wherein said system consists of a signal-squarer 902 which performs a square operation on received signal and a converter 904 which converts the square operated signal from a time domain to a phase domain by converting the square operated signal assuming a special case $$e^{j\Theta n} = e^{j(\phi + \Phi n)}$$

Also included in the system is a phase-metric-deriver 906 which derives the phase metric function and a maximizer 908 which maximizing said phase metric function. Finally, an extractor 910 extracts the RACH starting time from said maximized function.

Results via this method are better by 3 dB compared to the example of method 1. However, the noise variance of method 2 expect to be higher than method 1. The great advantage of method 2 is the random initial phase invariant.

Figure 5:
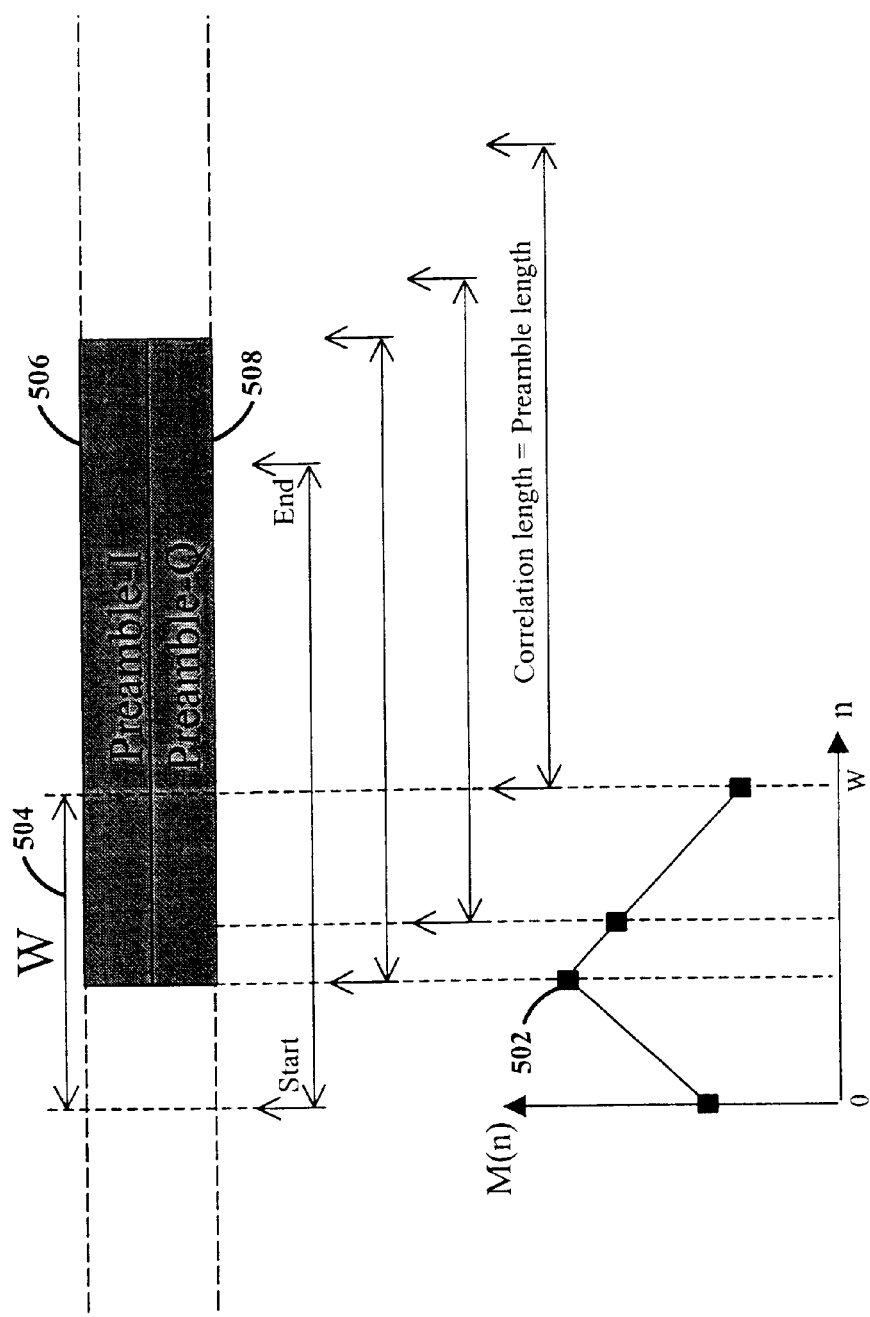
FIG. 5 illustrates the preamble search procedure.

When a search is performed at the expected window W, as shown in FIG. 5, the RACH STVE has to be performed for the whole W 504. The vicinity that would be chosen is for the maximum of M(n) 502. For the case that multiple preambles 506, 508 will reach the search window as represented by FIG. 3, the function M(n) might result with several peaks. Thus, some RACH receivers might get different vicinities to search for a specific preamble (and thereby estimate all RACH preambles starting time).

Hence, the current system gives a good estimate of the RACH start time. The above system and its described functional elements are implemented in various computing environments. For example, the present invention may be implemented on any existing or future mobile communication systems. The programming of the present invention may be implemented by one of skill in the art of cellular communications.

CONCLUSION

A system and method has been shown in the above embodiments for the effective implementation of two methods for estimating RACH starting times. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, transmission medium or communication system. In addition, the scope of the invention should not be limited by type of message transmitted, or location of system software code.

What is claimed is:

1. A method for estimating the random access channel starting time in a communication system, wherein said method comprises the steps of:

multiplying a $I_n$ and a $Q_n$ branch of a signal, where I is the in-phase component and Q is the quadrature component of an n sample of the signal;

converting said multiplied signal from a time domain to a phase domain;

dividing said converted signal into a phase metric function;

maximizing said phase metric function on an even or odd period, and extracting a starting time from said maximized function.

2. A method according to claim 1, wherein the step of maximizing the phase metric based on an odd period further comprises:

deriving phase metric function of L sliding window summations, and calculating a peak output of said phase metric function.

3. A method according to claim 1, wherein the step of maximizing the phase metric based on an even period further comprises:

deriving phase metric function using antipodal vector, and maximizing said derived metric function.

4. A method as per claim 1, wherein said communication system is a direct sequence digital spectrum communication system.

5. A method as per claim 1, wherein said communication system is compliant with a standard for $3^{rd}$ generation for cellular systems.

6. A method as per claim 1, wherein said step of converting said multiplied signal from a time domain to a phase domain is accomplished by converting said multiplication signal assuming a special case:

$$e^{j\Theta n} = [\cos(\phi + \Phi_n) + j(\sin \phi + \Phi_n)]$$

wherein φ is an initial phase, and $\Phi_n$ is a normalized phase.

7. An article of manufacture comprising a computer user medium having computer readable code embodied therein which estimates a random access channel starting time in a communication system, wherein said computer user medium including:

computer readable program code multiplying a $I_N$ and a $Q_N$ branch of a signal, where I is the in-phase component and Q is the quadrature component of the signal;

computer readable program code converting said multiplied signal from time domain to phase domain by converting said multiplied signal assuming a special case $$e^{j\theta n}=[\cos(\phi+\Phi_n)+j(\sin \phi+\Phi_n)]$$

wherein $\phi$ is an initial phase, and $\Phi_n$ is a normalized phase;

computer readable program code dividing said converted signal into a phase metric function;

computer readable program code maximizing said phase metric function based on an even or odd period, and computer readable program code extracting a starting time from said maximized function.

8. A method for estimating the random access channel starting time in a communication system, wherein said method comprises:

performing a square operation on a received signal;

converting said square operated signal from a time domain to a phase domain by converting said square operated signal assuming a special case $$e^{j\theta n}=e^{j(\phi+\Phi n)}$$

deriving phase metric function for said converted signal;

maximizing said phase metric function, and extracting a starting time from said maximized function, wherein $\phi$ is an initial phase, and $\Phi_n$ is a normalized phase.

9. A method as per claim 8, wherein said communication system is a direct sequence digital spectrum communication system.

10. A method as per claim 8, wherein said communication system is compliant with a standard for $3^{rd}$ generation for cellular systems.

11. An article of manufacture comprising a computer user medium having computer readable code embodied therein which estimated the random access channel starting time in a communication system, wherein said computer user medium including:

computer readable program code performing a square operation on a received signal;

computer readable program code converting square operated signal by converting square operated signal assuming a special case $$e^{j\theta n}=e^{j(\phi+\Phi n)};$$

computer readable program code deriving phase metric function for said converted signal;

computer readable program code maximizing said phase metric function, and computer readable program code extracting a starting time from said maximized function, wherein $\phi$ is an initial phase, and $\Phi_n$ is a normalized phase.

12. A system for estimating the random access channel starting time in a communication system, said system comprising:

a multiplier which multiplies a $I_N$ and a $Q_N$ branch of a signal, where I is the in-phase component and Q is the quadrature component of an N sample of the signal;

a converter which converts said multiplied signal from a time domain to a phase domain;

a phase-metric-divider which divides said phase domain signal into a phase metric function;

a maximizer which maximizes said phase metric function based on an even or odd period, and an extractor which extracts a starting time from said maximized function.

13. A system as per claim 12, wherein said converter which converts said multiplied signal from a time domain to a phase domain is accomplished by converting said multiplication signal assuming a special case:

$$e^{j\theta n}=[\cos(\phi+\Phi_n)+j(\sin \phi+\Phi_n)]$$

wherein $\phi$ is an initial phase, and $\Phi_n$ is a normalized phase.

14. A system for estimating the random access channel starting time in a communication system, said system comprising:

a signal-squarer which performs a square operation on a received signal;

a converter that converts said square operated signal from the time domain to the phase domain;

a phase-metric-deriver which derives a phase metric function;

a maximizer which maximizing said phase metric function, and an extractor which extracts a starting time from said maximized function.

15. A system as per claim 14, wherein said converter that converts said square operated signal from a time domain to a phase domain is accomplished by converting said square operated signal assuming a special case:

$$e^{j\theta n}=e^{j(\phi+\Phi n)}$$

wherein $\phi$ is an initial phase, and $\Phi_n$ is a normalized phase.

* * * * *